United States Patent [19]

Kato

[11] 4,184,946
[45] Jan. 22, 1980

[54] SEWAGE TREATMENT WITH NESTED SHORT TUBE CONTACT MEDIA

[76] Inventor: Masashi Kato, No. 5-2, 1-chome, Houjo, Daito-shi Osaka-fu, Japan

[21] Appl. No.: 805,225

[22] Filed: Jun. 9, 1977

[30] Foreign Application Priority Data

Jun. 11, 1976 [JP] Japan .................................. 51/69509

[51] Int. Cl.² .............................................. C02C 1/06
[52] U.S. Cl. ........................................ 210/14; 210/17; 261/92; 261/94; 261/DIG. 72; 428/198
[58] Field of Search ...................... 210/14, 17, 49, 150, 210/151, 282, 19, 500 R, 506, 507, 508, 510, 75; 261/92, 94, 95, 96, 97, 98, DIG. 72; D92/26, 33; D25/91

[56] References Cited

U.S. PATENT DOCUMENTS

| | | | |
|---|---|---|---|
| 464,669 | 12/1891 | Anderson | 210/150 |
| 513,536 | 1/1894 | Scowden | 210/150 |
| 1,939,924 | 12/1933 | Schimrigk | 261/DIG. 72 |
| 2,375,336 | 5/1945 | Weitkamp | 261/DIG. 72 |
| 2,615,699 | 10/1952 | Dixon | 261/DIG. 72 |
| 2,615,832 | 10/1952 | Dixon | 261/DIG. 72 |
| 3,232,210 | 2/1966 | Ogle | 261/92 |
| 3,335,081 | 8/1961 | El-Nagger | 261/92 |
| 3,347,381 | 10/1967 | Minch et al. | 210/150 |
| 3,540,589 | 11/1970 | Boris | 210/150 |
| 3,747,904 | 7/1973 | Gross | 261/92 |
| 3,941,695 | 3/1976 | Harris | 210/49 |
| 3,956,127 | 5/1976 | Holmberg | 261/92 |
| 3,962,087 | 6/1976 | Hartman | 261/92 |
| 3,966,604 | 6/1976 | Diggs | 210/151 |
| 4,009,099 | 2/1977 | Jeris | 210/17 |
| 4,022,689 | 5/1977 | Kato et al. | 210/151 |
| 4,122,011 | 10/1978 | Strigle | 261/94 |

FOREIGN PATENT DOCUMENTS

| | | | |
|---|---|---|---|
| 926772 | 5/1973 | Canada | 210/151 |
| 2553602 | 8/1976 | Fed. Rep. of Germany | 210/150 |
| 2702043 | 7/1977 | Fed. Rep. of Germany | 210/150 |
| 1363416 | 8/1974 | United Kingdom | 210/150 |
| 403422 | 3/1974 | U.S.S.R. | 210/150 |

*Primary Examiner*—Charles N. Hart
*Assistant Examiner*—Ernest G. Therkorn
*Attorney, Agent, or Firm*—Wenderoth, Lind & Ponack

[57] ABSTRACT

Process for sewage treatment by the travelling contact filter method. Buoyant filter media made of synthetic resin material are filled in a sewage tank and agitated by means of an agitating means to bring them into close contact with the sewage and air. Various forms of filter media and agitating means are proposed.

4 Claims, 37 Drawing Figures

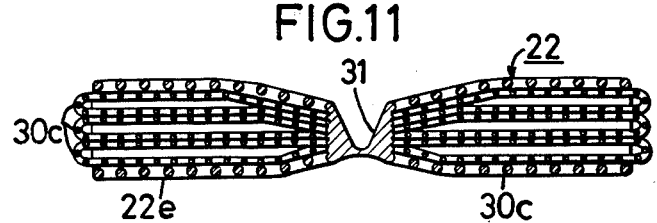
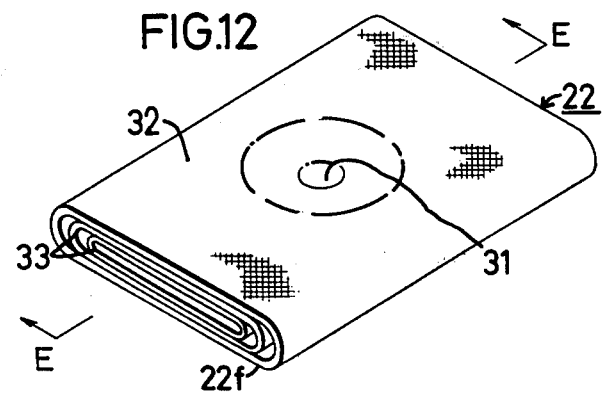
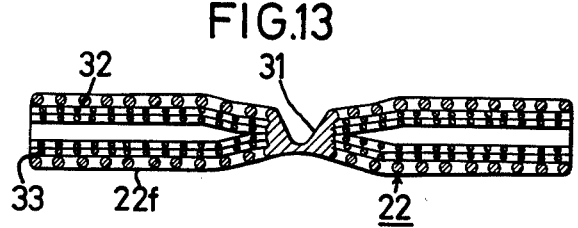
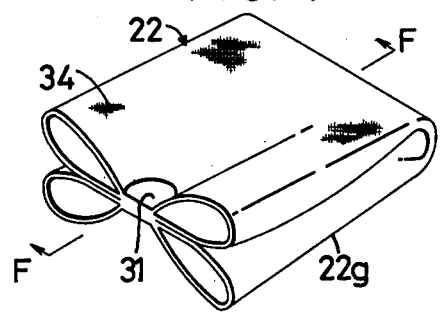
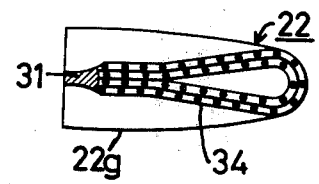

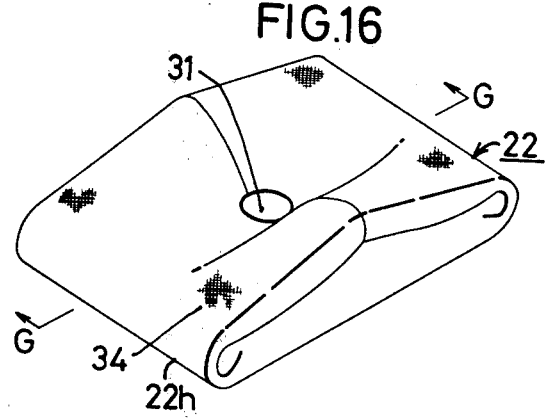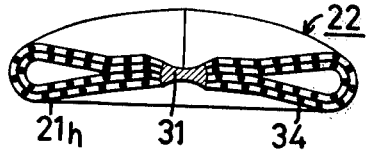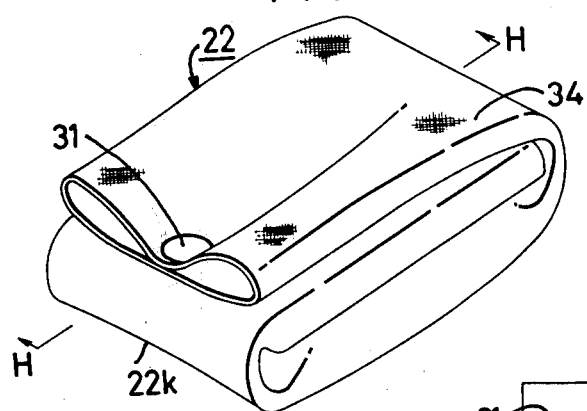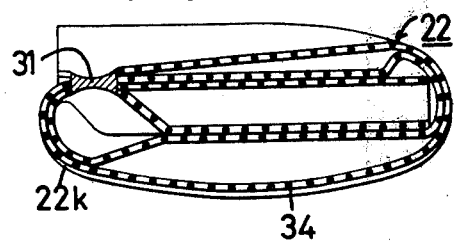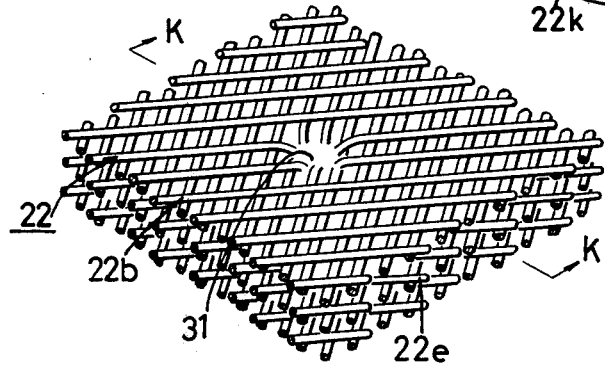

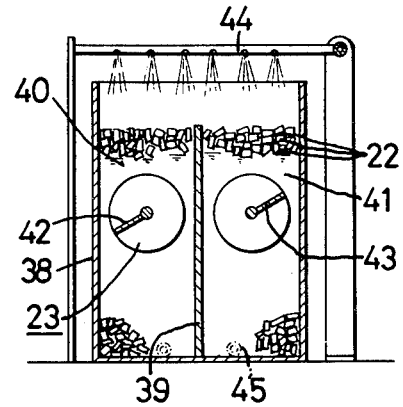
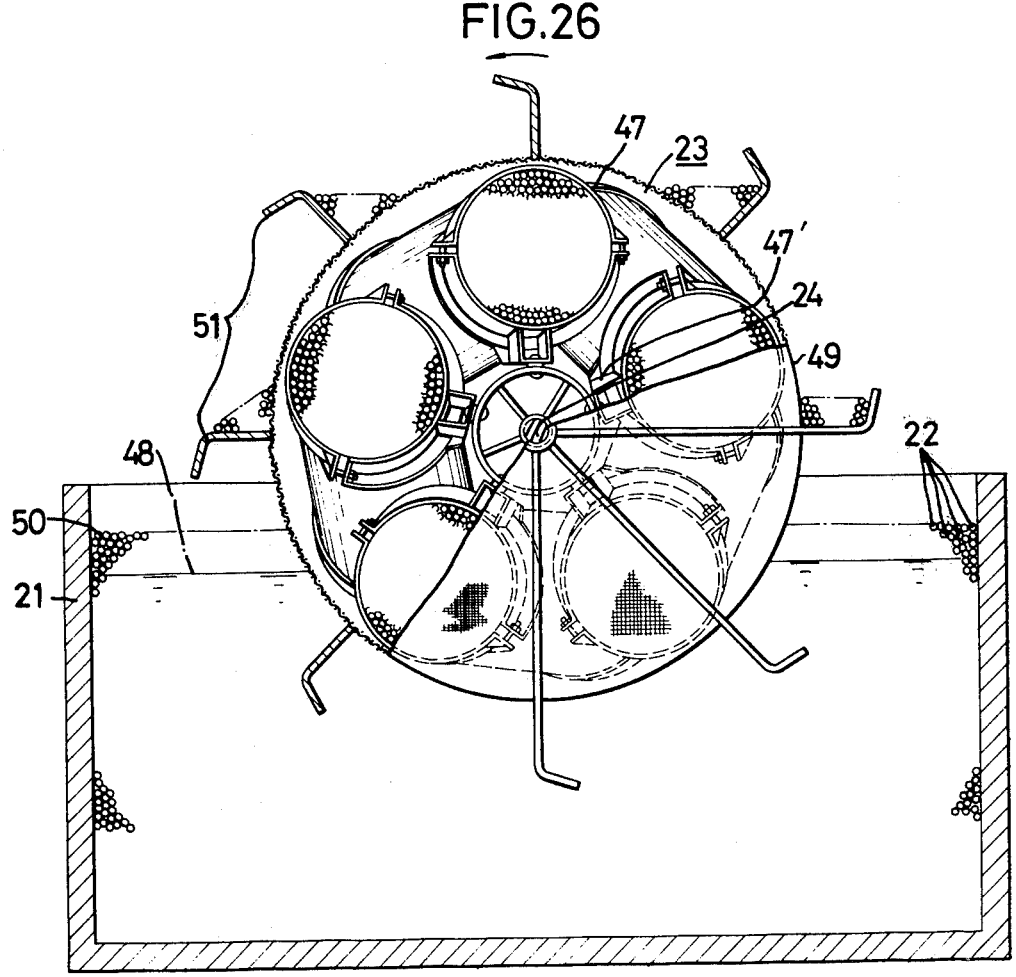

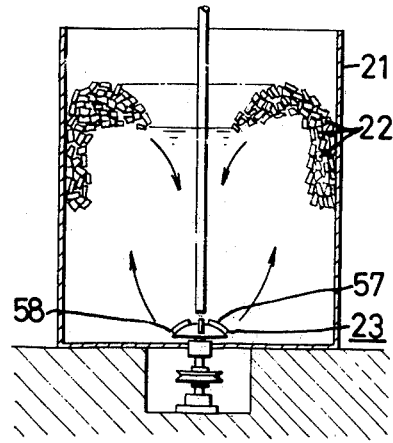
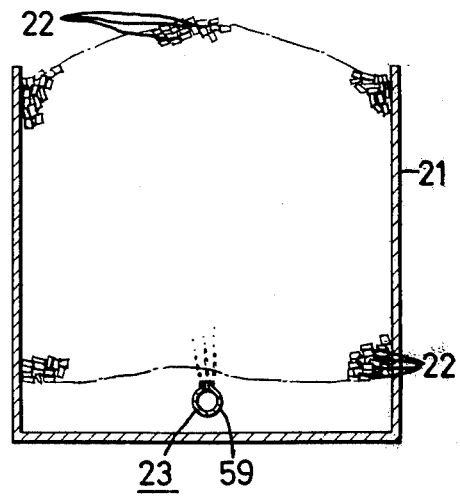
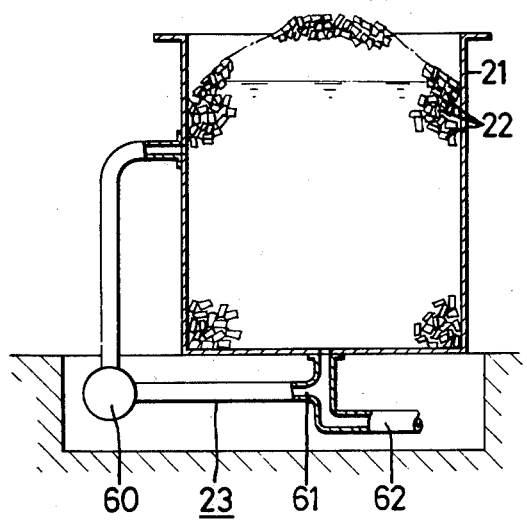

SEWAGE TREATMENT WITH NESTED SHORT TUBE CONTACT MEDIA

The present invention relates to a process for treating sewage by the moving contact bed method in which aerobic microorganisms that attach onto objects moving in the sewage and propagate are made use of to dispose the sewage containing organic matter.

Among conventional sewage treatment methods are (A) the trickling filter method, (B) the fixed contact bed method and (C) the rotating contact bed method. In the method (A), sewage is sprinkled onto a filter bed formed by such materials as rubbles, shells or synthetic resin. In the method (B), honeycombed pipes are submerged in the sewage to be treated and air is blown thereinto for aeration.

The method (C), which has been recently put into practical use, has two forms. In one form, a shaft having a plurality of large discs mounted thereon at short distances is rotatably supported horizontally about at the sewage level of a tank and is rotated so that the discs to emerge from and submerge into the sewage repeatedly. In the other form, a shaft having honeycombed tubes mounted obliquely with respect to the sewage level is rotated to emerge and submerge the tubes from and into the sewage.

These conventional methods had the following disadvantages. The method (A) features effective aeration, but has as its shortcomings high cost for pump operation, large noise, the breeding of flies on the filter bed, and the non-uniform attachment of microorganisms on the filter, which results in poor working efficiency of the contact media and the clogging of the filter bed.

The method (B) requires a compresser for aeration and a sprinkler and involves the high cost for the pump operation and non-uniform attachment of microorganisms. Further, this method is effective only for applications where BOD is 50 ppm or lower.

The method (C) has many advantages from high- to low-concentration sewage, minimum maintenance, effective aeration, little noise, small power requirement, large treatment capacity and no breeding of flies. Only one shortcoming thereof was the high manufacturing cost of a treatment system.

The present invention provides a process for sewage treatment in which filter media made of synthetic resin and having a specific gravity of less than 1 are filled in a sewage tank to serve as contact media for aerobic microorganisms and the sewage and said filters are agitated therein by an agitating means.

An object of the present invention is to provide a process for sewage treatment in which the contact of microorganisms with sewage and air is improved to increase the treatment capacity.

Another object of the present invention is to provide a process for sewage treatment in which filter media of synthetic resin floating in the sewage are used and uniform attachment of microorganisms on the filters is assured by providing an agitating means, thus eliminating the clogging by microorganisms.

A further object of the present invention is to provide a process for sewage treatment which makes possible the reduction in the size of treatment apparatus and in the costs for operation and maintenance.

Other objects and advantages of the invention will become apparent from the following description with reference to the accompanying drawings wherein:

FIG. 11 is a cross section taken on line D—D in FIG. 10;

FIG. 12 is a perspective view of the seventh embodiment of the filter media;

FIG. 13 is a cross section taken on line E—E in FIG. 12;

FIG. 14 is a perspective view of the eighth embodiment of the filter media;

FIG. 15 is a cross section taken on line F—F in FIG. 14;

FIG. 16 is a perspective view of the nineth embodiment of the filter media;

FIG. 17 is a cross section taken on line G—G in FIG. 16;

FIG. 18 is a perspective view of the tenth embodiment of the filter media;

FIG. 19 is a cross section taken on line H—H in FIG. 18;

FIG. 20 is a perspective view of the eleventh embodiment of the filter media;

FIG. 25 is a sectional side view taken on line M—M in FIG. 24;

FIG. 26 is a sectional front view of the treatment apparatus including the fourth embodiment of the agitating means;

FIG. 35 is a vertical sectional view of the seventh embodiment of the agitating means;

FIG. 36 is a vertical sectional view of the eighth embodiment thereof; and

FIG. 37 is a vertical sectional view thereof.

Figure 1:
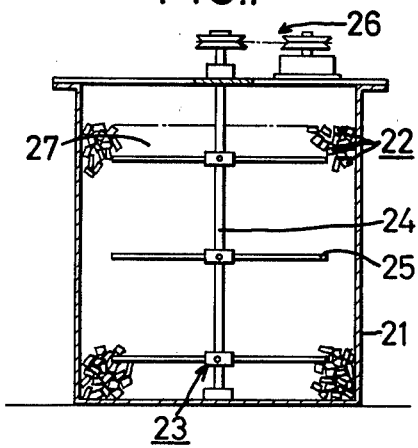
FIG. 1 is a sectional front view of the treatment apparatus including a first embodiment of an agitating means.

FIG. 1 shows an embodiment of this invention in which a sewage tank 21 is filled with the filter media 22 described later in detail. In the tank is provided agitating means 23 which include a shaft 24, agitating wings 25, and driving means 26 having a pulley, belt and motor.

For the filter media, a synthetic resin is most suitable because it has resistance to sewage, is easy to mold into a uniform shape and is available in large volumes. Preferably, the synthetic resin material used has a specific weight of less than 1 to minimize the power required for mechanical agitation and the wear due to mechanical agitation. Among such materials are polyethylene and polypropyrene. Their further advantages are low frictional coefficient and slipperiness.

Alternatively, synthetic resin materials heavier than water may be used after having been subjected to a foaming treatment to reduce the specific weight to below 1. This treatment increases the elasticity of the material.

The filter media 22 should be of such a shape as to leave spaces between one another to permit the passage of water even during mechanical agitation, without coming into close surface-to-surface contact with one another. For example, there will be suitable the Raschig ring used in a filling tower of a chemical apparatus, which is a thin short tube having a diameter about equal to its length, a member having a saddle-shaped curvature, a flat member having projections on both sides thereof, and so on.

Figure 2:
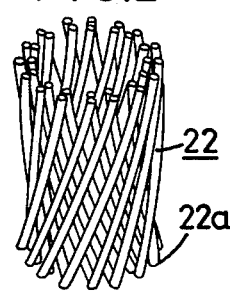
FIG. 2 is a perspective view of the first embodiment of the filter media used in this invention.

A first embodiment of the filter media 22 used in this invention is shown in FIG. 2. It is made in the form of a short net tube 22a from a synthetic resin such as polyethylene, polypropylene and polystyrene by foaming extrusion molding. Preferably, it has both a diameter and a length of 10-50 mm, with the diameter of each strand being 0.8-3 mm and the distances between the strands being 1-6 mm.

Such net tubes have the following advantages: they have small resistance to water; microorganisms easily cling to them and will not come off because the net tubes rub against one another only in a point-to-point manner; they can have a larger strength with the amount of material about equal to that required for a solid short tube having the same diameter; they have a suitable elasticity and a superior recoverability from deformation due to mechanical agitation; they also offer a large effective surface area to which microorganisms adhere.

The sewage tank 21 can be filled with the filter media 22 until they heap above the sewage level. Thus, the microorganisms adhering to the filter media are aerated while they are agitated. This adds to the advantage of the trickling filter method. The filter media 22 emerge from and sink into the sewage at frequent intervals as the agitator 23 operates. The sewage 27 and filters 22 are forcedly agitated in the sewage tank 21 for sewage treatment by the moving contact bed method.

Figure 3:
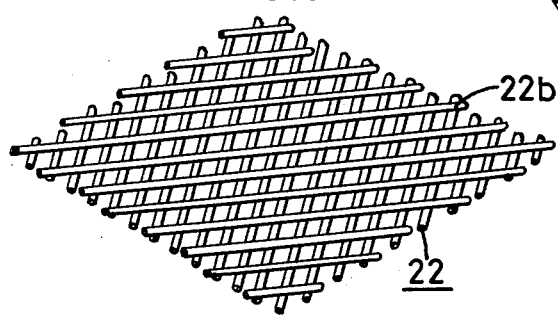
FIG. 3 is a perspective view of the second embodiment of the filter media.

FIG. 3 shows a second embodiment of filter media 22b which is in the form of a netted plate. It is made from the same kind of synthetic resins as in the first embodiment. Though a rectangular one is shown, it may be in any other shape.

Figure 5:
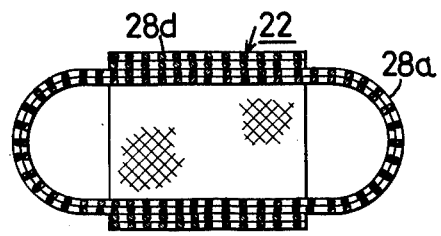
FIG. 5 is a cross section taken on line A—A in FIG. 4.
Figure 4:
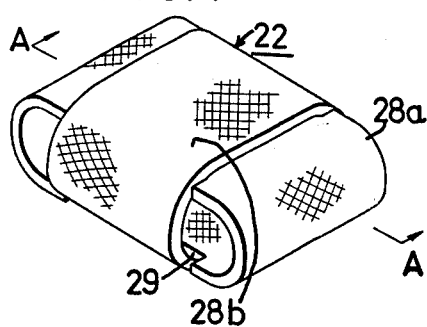
FIG. 4 is a perspective view of the third embodiment of the filter media.

FIGS. 4 and 5 show a third embodiment of filter media 22c which is formed by two net tubes 28a and 28b both having a diameter about equal to the length, the former being nested in the latter with their axes crossing at a right angle. Although in this embodiment the net tube 28a is formed with recesses 29 for engagement with the other tube, two net tubes may be held together by bonding or welding, of course. The other net tube 28b may also be provided with projections cooperating with the recesses 29.

Figure 6:
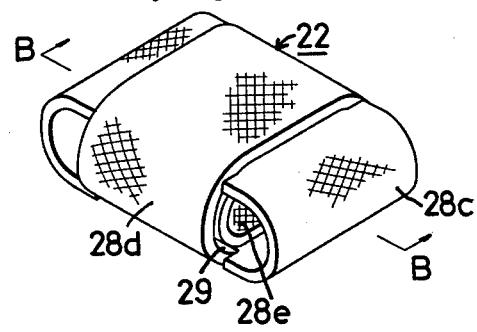
FIG. 6 is a perspective view of the fourth embodiment of the filter media.
Figure 7:
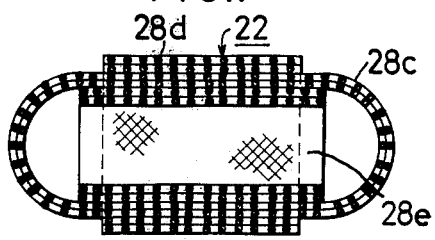
FIG. 7 is a cross section taken on line B—B in FIG. 6.

FIGS. 6 and 7 show the fourth embodiment of the filter which is constituted by three net tubes 28c, 28d and 28e having diameters decreasing in this order, one nested in another with their axes crossing at right angles.

The arrangement in the third and fourth embodiments has the following advantages: the amount of material required per unit contact surface can be substantially saved; they are not subject to deforming under compression even if relatively weak material such as polyethylene and polypropyrene is used or if the net tubes have thin strands; they have less chance of breakage than thin plate filters and promote the contact between sewage and air; also, the microorganisms adhering to the inside of the tubes easily peel off because of their netted structure.

Figure 8:
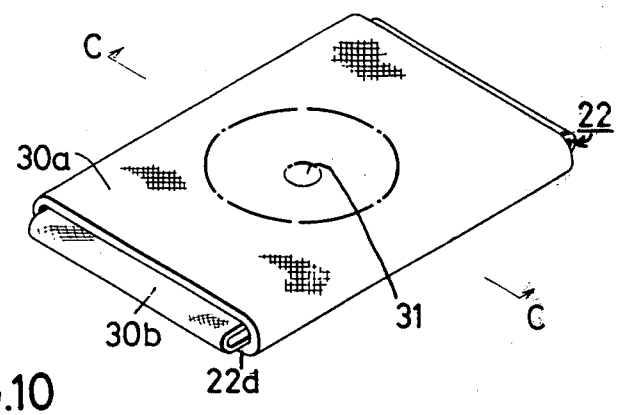
FIG. 8 is a perspective view of the fifth embodiment of the filter media.
Figure 9:
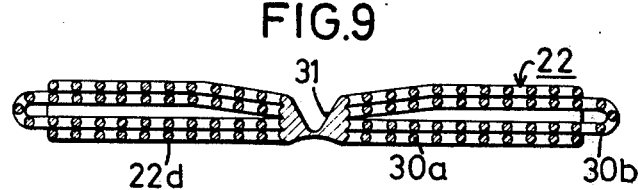
FIG. 9 is a cross section taken on line C—C in FIG. 8.

FIGS. 8 and 9 show the fifth embodiment of the filter media 22d constituted by nesting a net tube 30b in a similar net tube 30a with their axes crossing at a right angle, pressing them flat and melting them together at 31 in the center.

Figure 10:
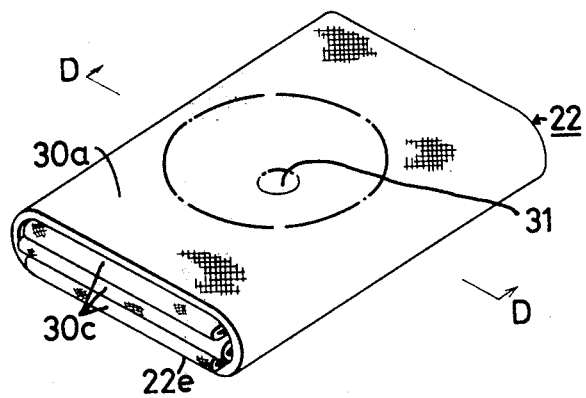
FIG. 10 is a perspective view of the sixth embodiment of the filter media.

FIGS. 10 and 11 show the sixth embodiment of the filter 22e made in a manner similar to the embodiment of FIGS. 8 and 9, except that a pluralitty of net tubes 30c are nested one upon another in the net tube 30a.

FIGS. 12 and 13 show the seventh embodiment of the filter 22f similarly made but by nesting in the outer tube 32 a plurality of net tubes 33 of decreasing diameters in steps, one in another, with their axes in a line.

The seventh embodiment of filter may be conveniently manufactured by, while drawing the outer net tube, drawing out the inner net tubes made beforehand in the outer tube to form a long multiple net tube, heat welding the multiple net tube at suitable distances, and cutting into individual multiple net tubes.

A modified form of such multiple net tubes may be formed by nesting in the outer net tube a plurality of inner tubes of the same diameter, one upon another instead of one in another, with their axes in a line. Other modifications may be formed by putting the multiple tubes, as described above, one upon another and heat welding them together at one point.

In any of the embodiments, the inner net tubes should have a smaller strand diameter than the outer net tube to facilitate the peeling of waste microorganism scale and increase the surface area on which microorganisms attach.

Welding in the center of net tubes may be made by means of an ultrasonic welder instead of ordinary heat welding devices.

In the above embodiments, the net tubes are welded together after being pressed flat to decrease the inner space of the multiple net tube and the volume occupied by the filter media per unit surface area. This increases the number of filter media that can be filled in a sewage tank and enables the size of a sewage treatment system to be reduced. The multiple net tubes in the third to seventh embodiments less frequently rub against one another because of the reduction in the number required per unit surface area effective for contact, thus decreasing wear or breakage.

FIGS. 14 and 15 show the eighth embodiment of filter 22g which is formed by a net tube 34 of synthetic resin folded laterally into two and welded at 31 to join the edges together.

FIGS. 16 and 17 show the nineth embodiment of filter 22h which is formed by a net tube 34 folded from its both ends toward the center and welded at 31 in the center to hold the ends and the bottom section.

FIGS. 18 and 19 show the tenth embodiment of filter 22k which is formed by a net tube 34 folded laterally into three and welded at 31 to secure the top free end to the lower section. The net tube 34 may be folded into more than three or folded in any other manner. Also, the end may be secured by sewing or other method instead of welding.

Although the net tube is folded laterally in the embodiments shown in FIGS. 14 to 19, a long net tube of larger diameter may be folded lengthwise, welded to prevent it from unfolding and cut into required lengths.

Figure 21:
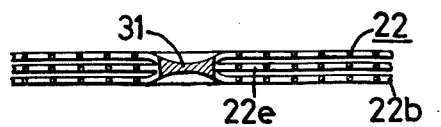
FIG. 21 is a cross section taken on line K—K in FIG. 20.

FIGS. 20 and 21 show the eleventh embodiment of filter 22l which is formed by a plurality of net plates 22b of synthetic resin laid one upon another and welded at 31 to hold in an overlapped state. This embodiment is easy to manufacture but has a disadvantage of offering a greater resistance to mechanical agitation.

Figure 22:
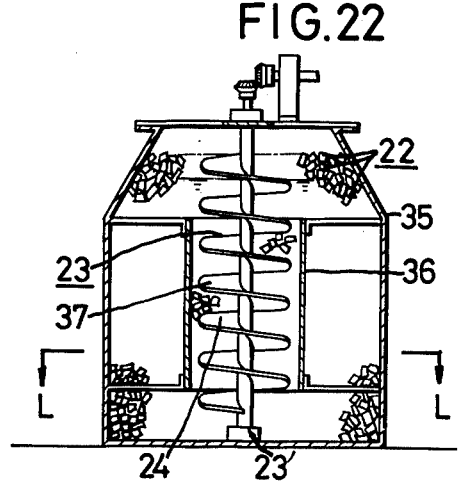
FIG. 22 is a sectional side view of the second embodiment of the agitating means.
Figure 23:
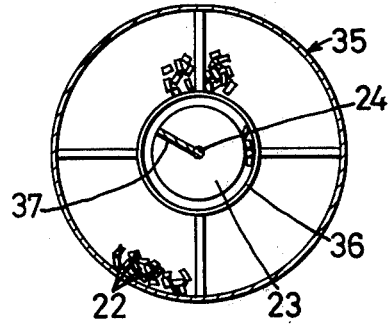
FIG. 23 is a cross section taken on line L—L in FIG. 22.

A second embodiment of the agitation means 23 according to the invention will now be described in detail with reference to FIGS. 22 and 23, in which the numeral 23' designates an agitator of the agitating means 23 of the screw type. A tubular partition wall 36 is provided in a cylindrical sewage tank 35, a screw 37 being rotatably mounted inside the partition wall 36 and slowly rotated by a motor or the like (not shown), thereby causing the sewage and the filter media to circulate convectively along the inside and outside of the partition wall 36. This makes it possible to increase the depth of the sewage tank 35 and decrease the installation space.

Figure 24:
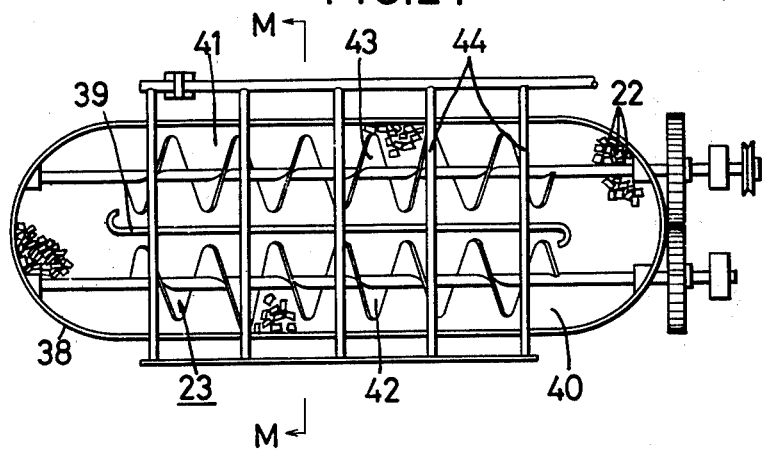
FIG. 24 is a plan view of the third embodiment of the agitating means.

FIGS. 24 and 25 show a third embodiment of the agitating means 23 of the screw type for horizontal agitation. A partition wall 39 is longitudinally provided inside the central part of an elliptical sewage tank 38, screws 42, 43 being mounted in circulation channels 40, 41 formed by the partition wall 39, respectively. The two screws 42, 43 are rotated in the same direction or in the reverse direction in accordance with the direction of the twist thereof to cause the filter media 22 to circulate along the circulation channels 40, 41.

In this embodiment, the filter media 22 can be filled so as to heap above the sewage level to increase the contact surface area drastically. Consequently, a single apparatus can have a large treatment capacity. The filter media submerge in and emerge from the sewage more frequently as a result of the agitation, thereby improving the aeration effect which is the most important for the sewage treatment.

Furthermore, if sprinkler pipes 44 are provided at suitable positions above the sewage tank 38 to supply the raw sewage or to sprinkle part of the sewage pumped up from the sewage tank 38, the filter media 22 during their travel are infallibly sprinkled with sewage while passing under the sprinkler pipes 44 thereby to preclude the risk of the microbes adhering to the surfaces thereof being dried to death. This simultaneously achieves the trickling filter effect, thus resulting in an increase of the treatment capacity.

Moreover, an air pipe 45 can be easily provided in the bottom of the sewage tank 38 for effective aeration of the sewage.

The agitating means 23 may be formed by an agitator integrally mounted on a shaft provided obliquely relative to the sewage tank.

Figure 27:
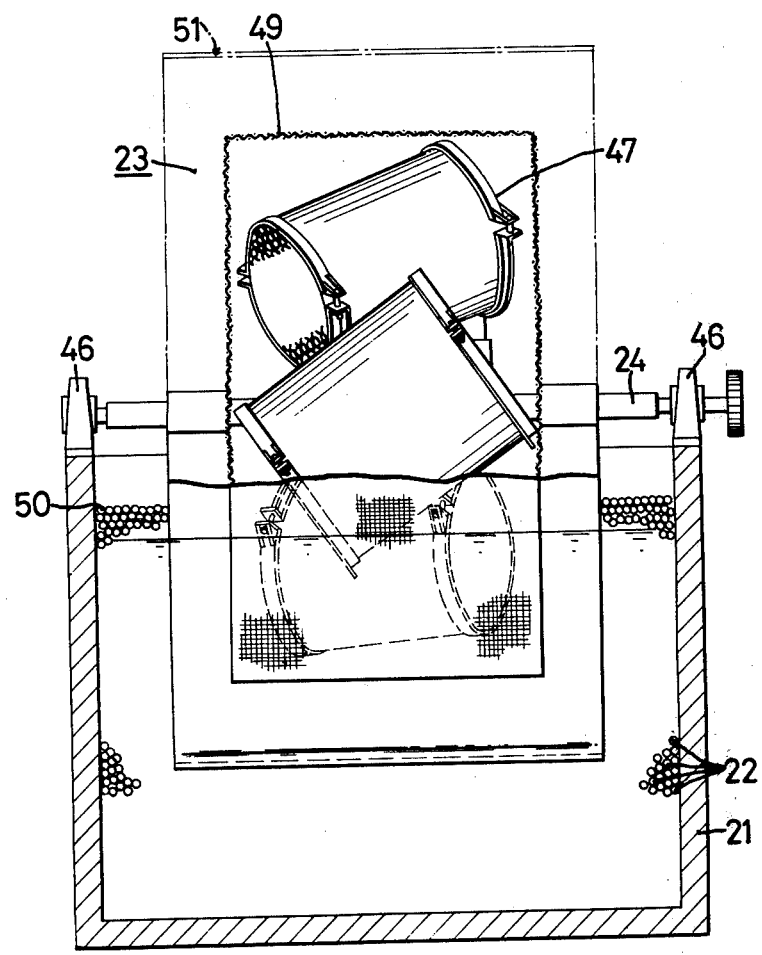
FIG. 27 is a sectional side view of the apparatus of FIG. 26.

A fourth embodiment of the agitating means 23 will now be described in detail in reference to FIGS. 26 and 27, in which the numeral 21 designates a sewage tank, a rotary shaft 24 of a rotary contact filter 47 (the drawing shows the type of a diagonal honeycombed pipes) being horizontally supported adjacent the sewage surface 48 by bearings 46 provided on the side walls of the sewage tank 21, the rotary contact filter 47 being rotated in the arrow-indicated direction at a low speed of 0.5-2.0 r.p.m. This is the conventional rotary contact filter sewage treating apparatus. If the rotary contact filter 47 is rotated continuously, influx and efflux of the sewage are repeated in succession and aerobic microbes begin to multiply on the surface of the contact filter. The microbes adhering to the contact filter, ingest organic matter in the sewage as nutriments and decompose them by oxidization, thereby purifying the sewage.

The rotary contact filter itself is an aeration apparatus having a very big aeration capacity. It can treat sewage of high B.O.D. of 8,000-10,000 P.P.M. without the help of a compressor and sprinklers. In case the B.O.D. is below 1,000 P.P.M., however, the aeration capacity will be too large, and if oxygen dissolved in the sewage reach saturation, aeration will become useless. In this case, if the revolution is slowed down, the treatment capacity will be reduced even when dissolved oxygen is sufficient. Moreover, even if the revolution is slowed down, there will be no perceptible decrease in the power consumption. Therefore, the rotary contact filter apparatus is very expensive and luxurious for sewage with B.O.D. of below 1,000 P.P.M.

The invention has as an object to use the rotary contact filter 47 as an aerating and agitating apparatus for agitating inexpensive filter media by effectively utilizing the aeration power thereof and without reducing the capacity thereof. The apparatus according to the invention comprises a shaft 24 horizontally provided in a sewage tank 21, rotary contact filters 47' radially mounted on the shaft 24, and a means for rotating the shaft 24, for example, a motor. The entire rotary contact filter 47 is enclosed by a perforated plate or a wire net 49 to protect it against wear and minimize undesirable exfoliation of adhering microbes. The buoyant filter media 22 are stuffed in the sewage tank outside of the rotary contact filter 47 to form a travelling contact filter 50.

If agitation plates 51 are radially mounted on the rotary shaft 24 outside of the perforated plate, the filter media 22 are scooped up as the shaft 24 rotates to increase the agitation effect. As the filter media 22 travel in the sewage and in the air in succession, they are well aerated and brought into contact with sewage alternately. Since they constitute excellent contact media for microbes adhering thereto, the microbes multiply satisfactorily to greatly increase the sewage treatment capacity of the apparatus.

Each unit constituting the rotary contact filter 47 may be covered by a wire net independently, or the covering by a perforated plate or a wire net may be omitted.

The rotary contact filter 47 itself also is a contact media to which microbes adhere. It not only purifies the sewage but also acts as an aeration and water current producing apparatus. Particularly, in the case of an oblique honeycombed pipe assembly (as shown in the drawing), since the sewage flows through the pipe assembly to the outside of the perforated plate 49 and then enters said pipe assembly again from the opposite side thereof after passing through the travelling contact filter 50, the agitation effect is maximized. In the case of the disk type, sewage tends to stagnate between the disks inside the perforated plate. Moreover, a perforated plate or a wire net is indispensable for the disk type.

As described hereinbefore, the invention can minimize the size of the expensive rotary contact filter by partly replacing it with inexpensive travelling contact filter 50, thereby solving the problem of high cost of the conventional rotary contact filter. Furthermore, the invention makes it possible to obtain a large equipment having a large contact surface at low cost, to dispense with an aeration apparatus required in the case of the fixed contact filter, to preclude the generation of noises and the clogginess of the filters, and to assure uniform attachment of microbes on all the travelling contact filters.

The travelling contact filters are expendables. Since they have the same filtering effect even when worn or broken as a result of agitation, they are usable until they are reduced to small fragments.

In tests conducted by the inventor for over one year in the past, the travelling contact filters 22 and the rotary contact filter 47 without a wire net cover were completely free from wear because the sewage and microbes acted as lubricants and the travelling contact filters were very light in weight.

Since the rotary contact filter 47 is protected by a perforated plate, its durability and treatment capacity are the same as in the conventional apparatus with no travelling contact filters. Generally, the rotary contact filter necessitated a semicylindrical inner bottom for the sewage tank so as to preclude a short circuit between the original sewage and the treated sewage. According to the invention, however, no such short circuit arises even if the sewage tank is square. Thus, the sewage treatment apparatus according to the invention has great advantages in that the tank is capable of storing a larger volume of sewage, the sewage under treatment stays longer for a higher degree of purification, and moreover the construction cost is lower.

A fifth embodiment of the agitating means 23 will now be described in detail with reference to FIGS. 28 to 32, in which the agitating means 23" is provided in the upper part of the sewage tank 21 to cause the filter media 22 to circulate therein. It comprises a shaft 24 with an inner wheel 52 mounted on each side thereof by means of radial arms 53, a plurality of scooper members 54 mounted between the inner wheels 52 with suitable spacings with both ends thereof secured to the inner wheels 52. The scooper members 54 are formed in the shape of elongated vessels open at one side thereof, and circumferencially spaced about the shaft 24. Each of the scooper members 54 is secured at its outer peripheral end to an outer wheel 55 to increase its strength.

Figure 28:
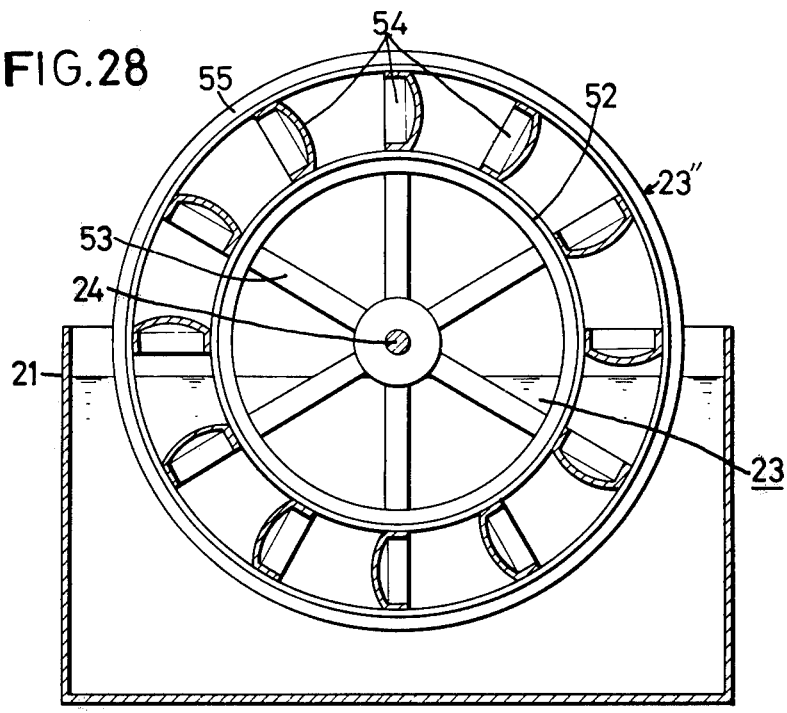
FIG. 28 is a sectional front view of the treatment apparatus including the fifth embodiment of the agitating means.
Figure 29:
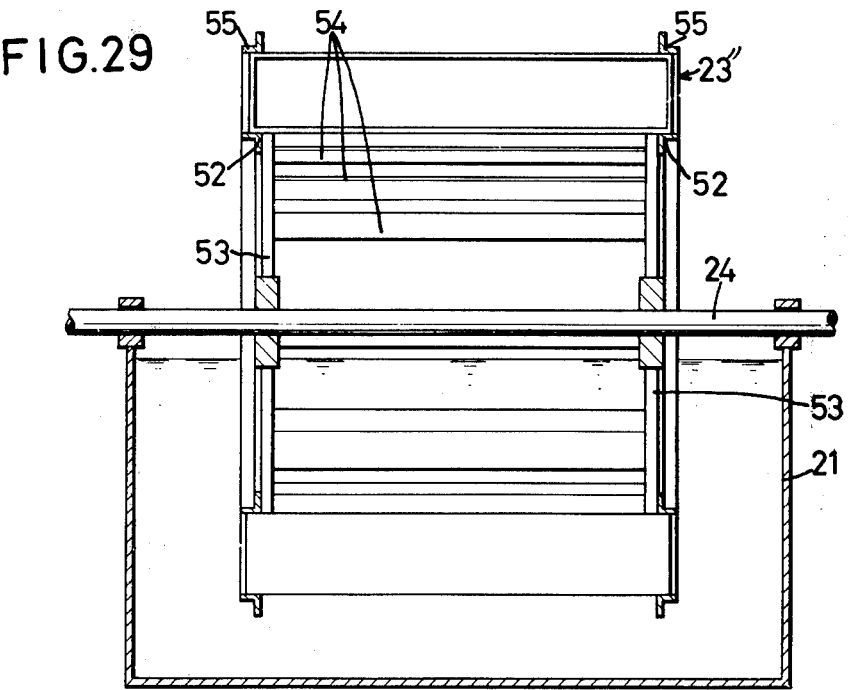
FIG. 29 is a sectional view of the apparatus of FIG. 28.
Figure 30:
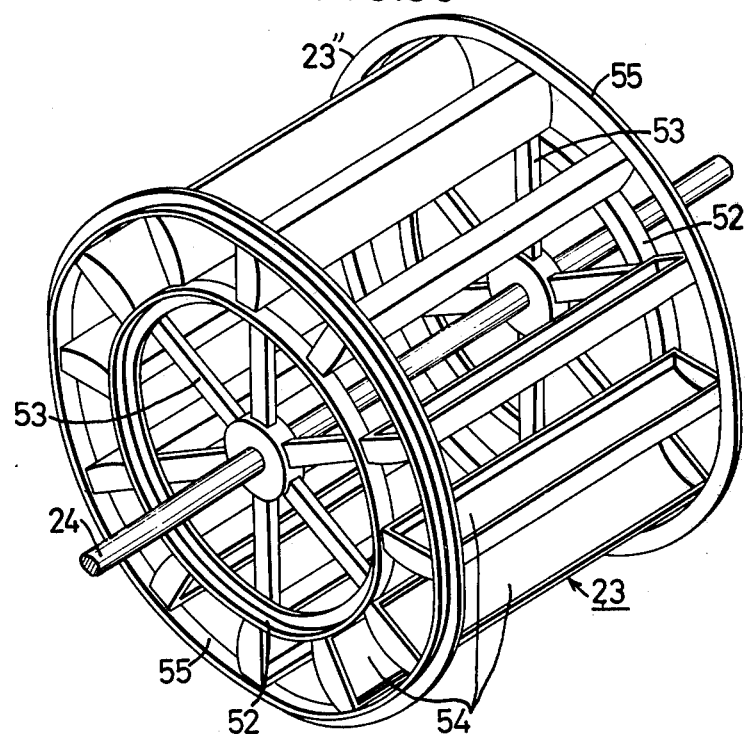
FIG. 30 is a perspective view of the agitating means of FIG. 28.

The agitating means 23" is mounted in the sewage tank 21 so that about half the scooper members 54 may be immersed in the sewage as shown in FIG. 28. The shaft 24 is supported by the side walls of the sewage tank 21 through bearings. To one projecting end of the bearing is connected a drive means (not shown) to impart to it a counterclockwise rotation in FIG. 28.

Figure 31:
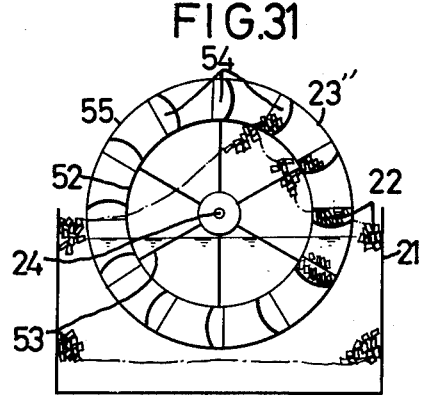
FIG. 31 is a front view thereof showing the manner of sewage treatment.

The filter media 22 are stuffed in the sewage tank in such an amount that they will be exposed above the sewage level as shown in FIG. 31.

If the agitating means 23" is rotated at a low speed in the counterclockwise direction, the scooper members 54 scoop up sewage and filter media 22 during their upward travel and dump them during their downward travel.

Figure 32:
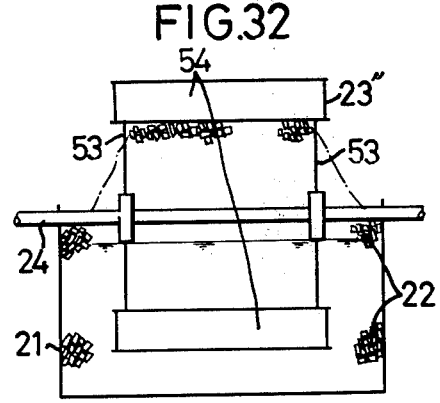
FIG. 32 is a side view thereof.

The filter media 22 dumped by the scooper members, however, are prevented by their buoyancy from escaping downwardly into the sewage. As shown in FIGS. 31 and 32, they heap in the agitating means 23", travelling toward both sides of the sewage tank 21 until they are carried up again by the rising scooper members 54. The sewage spilled from the scooper members 54 is sprinkled over the heap of the filter media 22 exposed to the atmosphere, whereas the entrapped air is discharged into the sewage for aeration. Thus, as the agitating means 23" rotate, not only the filter media 22 are forced to circulate between the sewage and the atmosphere alternately, but also sewage is sprinkled from above and air is blown into the sewage. Thus, the sewage treatment is conducted with high efficiency.

Figure 33:
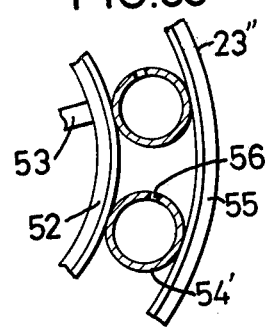
FIG. 33 is a sectional front view of a portion of a scooper means used in the sixth embodiment of the agitating means.
Figure 34:
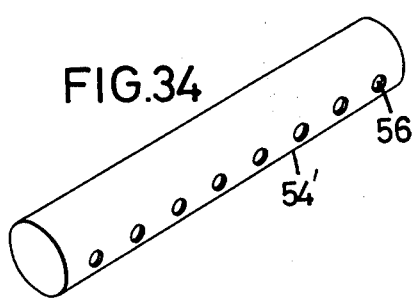
FIG. 34 is a perspective view of the scooper means in FIG. 33.

A sixth embodiment as a modification of the fifth embodiment is shown in FIGS. 33 and 34. In this embodiment, the scooper members 54 in FIGS. 28 to 32 are replaced by a pipe 54' with its both ends closed. The pipe 54' is formed with a suitable number of holes 56 on its front face in the direction of rotation. When it is in the sewage, the sewage enters it through the holes 56 while discharging air. When it emerges from the sewage, it spills sewage through the holes 56 while replenishing air therethrough, The sewage is sprinkled over the filter media 22 located therebelow. Thus, the pipe 54' does the sprinkling and aeration of sewage in addition to the agitation of the filter media 22, increasing the efficiency of sewage treatment. The holes 56 may be formed in the shape of slits. The manner of travel of the filter media 22 is the same as in the fifth embodiment.

A seventh embodiment of the agitating means 23 is shown in FIG. 35. At the bottom of the sewage tank 21 is provided an impeller 57 which is rotated at a high speed by a motor or the like to produce a rotary and vertical water current in the sewage so as to agitate the filter media 22. There is also provided air suction means 58 utilizing the centrifugal force of the sewage resulting from the high-speed rotation of the impeller 57 to subject the sewage to aeration with the air from the air suction means 58. This increases the sewage treatment efficiency. The air suction means 58 may be of a conventional type.

An eighth embodiment of the agitating means 23 will be shown in FIG. 36. At the bottom of the sewage tank 21 there is provided an air ejection pipe 59. If air is blown into the sewage tank 21 stuffed with filter media 22, the sewage is forced to circulate convectively, thus causing the buoyant filter media 22 to heap above the sewage level and then dip thereinto in the manner of convection. The air blow into the sewage from the air pipe is dispersed and reserved by the filter media 22, which heap above the sewage level due to increased buoyancy, thereby assuring effective aeration and saving the energy required for aeration.

FIG. 37 shows a nineth embodiment in which an upward current is produced in the sewage by means of a sewage stream blown from bottom, agitating the filter media. A discharge pipe 61 from a pump 60 is connected to the bottom of sewage tank 21, a suction port being provided at the upper part thereof. The sewage in the sewage tank 21 is caused to circulate from the blowoff port to the suction port. A known air ejector means 62 is provided at the blowoff port to blow air into the sewage for aeration. The process according to this embodiment achieves the same aeration effect as in the preceding two embodiments. Moreover, the upward stream causes the filter media to heap higher in the air and further heighten the convection effect.

As described hereinbefore, this invention makes it possible not only to treat the sewage with greater efficiency but also to reduce the dimensions of the equipment and the cost of construction and maintenance. Furthermore, the apparatus according to the invention is also useful as a air-fluid contact apparatus, for example, for cooling hot water.

We claim:

1. A process for treating sewage in a sewage tank comprising filling a sewage tank with filter media consisting of a nest of a plurality of short net tubes one in the other and that have been pressed flat and welded together at least at one point to keep them flat, said tubes being composed of a synthetic resin material and having a specific gravity of less than 1 and agitating said filter media and sewage in the sewage tank by an agitating means.

2. A process as claimed in claim 1 wherein said agitating means include a shaft vertically mounted in the sewage tank, agitators mounted on said shaft, and means for rotating said shaft.

3. A process as claimed in claim 1 wherein said agitating means include a shaft horizontally mounted in the sewage tank, agitators mounted on said shaft, and means for rotating said shaft.

4. A process as claimed in claim 1 wherein said agitating means include a shaft horizontally mounted in the sewage tank, a plurality of arms radially mounted on said shaft, and a plurality of scooper means circumferentially supported by said arms with suitable spaces therebetween, and means for rotating said shaft.

* * * * *